United States Patent
Brüse

(10) Patent No.: US 9,765,281 B2
(45) Date of Patent: Sep. 19, 2017

(54) REMOVAL OF UNWANTED PROPANOL COMPONENTS

(71) Applicant: CARGILL, INCORPORATED, Wayzata, MN (US)

(72) Inventor: Falk Brüse, Drensteinfurt (DE)

(73) Assignee: CARGILL, INCORPORATED, Wayzata, MN (US)

( * ) Notice: Subject to any disclaimer, the term of this patent is extended or adjusted under 35 U.S.C. 154(b) by 0 days.

(21) Appl. No.: 15/036,488

(22) PCT Filed: Nov. 10, 2014

(86) PCT No.: PCT/US2014/064773
§ 371 (c)(1),
(2) Date: May 13, 2016

(87) PCT Pub. No.: WO2015/073359
PCT Pub. Date: May 21, 2015

(65) Prior Publication Data
US 2016/0298053 A1    Oct. 13, 2016

(30) Foreign Application Priority Data

Nov. 14, 2013 (EP) ..................................... 13005366

(51) Int. Cl.

| | | |
|---|---|---|
| *C11B 3/12* | (2006.01) | |
| *C11B 3/00* | (2006.01) | |
| *C11B 3/10* | (2006.01) | |
| *C11B 3/14* | (2006.01) | |
| *B01D 1/26* | (2006.01) | |
| *C11B 3/08* | (2006.01) | |

(52) U.S. Cl.
CPC ................. *C11B 3/12* (2013.01); *B01D 1/26* (2013.01); *C11B 3/001* (2013.01); *C11B 3/08* (2013.01); *C11B 3/10* (2013.01); *C11B 3/14* (2013.01)

(58) Field of Classification Search
CPC .... C11B 3/00; C11B 3/12; B01D 1/26; A23D 9/04
See application file for complete search history.

(56) References Cited

U.S. PATENT DOCUMENTS 6,278,008 B1 *  8/2001  Endo ........................ A61K 8/39
                                                              426/329
2016/0227809 A1 *  8/2016  Mellerup ................. A23D 9/04

FOREIGN PATENT DOCUMENTS

EP          2514813      * 10/2012  ............... C11B 3/14
WO    2015073359 A1      5/2015

OTHER PUBLICATIONS

Pudel, F., et al., Mitigation of 3-MCPD and G esters in refined palm oil, 2012, 103rd AOCS Annua. Meeting & Expo Apr. 29-May 2, 2012, 13 pages.*
Pudel, F. et I., 3-MCPD- and glycidyl esters can be mitigaed in vegetable oils by use of short path distillation, 1st Publication Jun. 13, 2015, Eur. J. Lipid Sci. Technol. vol. 118, pp. 396-405.*
B Matthäus et al., "Mitigation of 3-MCPD etsers in refined vegetable oils", Baking + Biscuit International, Jan. 1, 2012(Jan. 1, 2001), pp. 12-15, XP055110576.
Bertrand Matthäus et al., "Mitigation of 3-MCPD and glycidyl esters within the production chain of vegetable oils especially palm oil", Lipid Technology, vol. 25, No. 7, Jul. 10, 2013, pp. 151-155, XP055110706.
Frank Pudel et al., "On the necessity of edible oil refining and possible sources of 3-MCPD and glycidyl esters", European Journal of Lipid Science and Technology, vol. 113, No. 3, Mar. 1, 2011, pp. 368-373, XP055027580.
Oterhals A et al., "Modeling of a short-path distillation process to remove persistent organic pollutants in fish oil based on process parameters and quantitative structure properties relationships", Chemosphere, Pergamon Press, Oxford, GB, vol. 80, No. 2, Jun. 1, 2010, pp. 83-92, XP027417490.
International Search Report for corresponding patent application No. PCT/US2014/064773, Mailed Mar. 19, 2015, 2 pages.

* cited by examiner

*Primary Examiner* — Yate K Cutliff

(57) ABSTRACT

The present invention relates to the use of short-path evaporation for reducing from deodorized triglyceride oils the content of propanol components selected from chloropropanols, chloropropanol fatty acid esters, epoxypropanols, epoxypropanol fatty acid esters, and combinations of two or more thereof. It further relates to the use of short-path evaporation wherein further the content of acyl glycerol components is reduced and these acyl glycerol components are selected from diacyl-glycerols, triglycerides with molecular weight in the range below 730 and mixtures of two or more thereof.

10 Claims, No Drawings

REMOVAL OF UNWANTED PROPANOL COMPONENTS

CROSS-REFERENCE TO RELATED APPLICATIONS

This application is a national phase application of international application PCT/US2014/064773, filed Nov. 10, 2014, which claims priority to European Patent Application No. EP13005366 filed Nov. 14, 2013, both of which are hereby incorporated by reference in their entirety.

FIELD OF THE INVENTION

The present invention relates to the removal of unwanted propanol components in deodorized triglycerides.

BACKGROUND OF THE INVENTION

Crude oils, as extracted from their original source, are not suitable for human consumption due the presence of high levels of contaminants—such as free fatty acids, phosphatides, soaps and pigments—which may be toxic or may cause an undesirable colour, odour or taste. Crude oils are therefore refined before use. The refining process typically consists of three major steps: degumming, bleaching and deodorizing. An oil obtained after completion of the refining process (called a "refined oil") is normally considered suitable for human consumption and may therefore be used in the production of any number of foods and beverages.

It has now been found that the crude oil refining process itself contributes to the introduction, of various levels of 3-monochloropropane-1,2-diol fatty acid esters (3-MCPD esters) and glycidyl esters. 3-MCPD ester and glycidyl ester amounts are depending on oil type and refining process. Most vegetable oils show 3-MCPD ester contents between 200-800 ppb and Glycidyl ester content below 500 ppb, but for palm oil or specific process conditions values even above 5000 ppb might be found.

Free 3-monochloropropane-1,2-diol (3-MCPD) has been identified as a contaminant for a long time in various foods. Recent studies have identified 3-MCPD fatty acid esters in refined edible fats and in fat-containing foods. 3-MCPD esters are formed at high temperatures, in particular during deodorization. Also 2,3-epoxy-1-propanol (glycidol) is formed in the deodorization step. Both glycidyl esters and 3-MCPD esters are associated with a possible carcinogenic effect.

EP 2 449 070 describes a process for removing unwanted propanol components from unused triglyceride oil including contacting the contaminated oil with an adsorbent.

A further suggestion for reducing 3-MCPD ester content is made in WO2010/036450 (Süd-Chemie). It is based on a modified refilling process which uses very intensive bleaching (with high amounts of bleaching clays).

WO2012/107230 describes an alternative process for the reduction of 3-MCPD and/or glycidyl ester content and wherein the process comprises subjecting an oil to the following steps, in order: a) a bleaching step, b) a deodorization step, c) a final bleaching step, and d) a final deodorization step wherein the final deodorization step d) is carried out at a temperature at least 40° C. lower than deodorization step b).

It would be desirable to have a simple, mild but effective process for the removal of these unwanted propanol fatty acid esters.

The current invention provides such a process.

SUMMARY OF THE INVENTION

The current invention relates to the use of short-path evaporation for reducing from deodorized triglyceride oils the content of propanol components selected from chloropropanol fatty acid esters, epoxypropanol fatty acid esters (=glycidyl esters), and combinations of two or more thereof, wherein the short path evaporation is performed at a pressure below 1 mbar, preferably below 0.05 mbar, more preferably below 0.01 mbar, most preferably below 0.001 mbar.

Furthermore, depending upon the conditions applied in short path evaporation, beyond the removal of 3-MCPD esters and Glycidyl esters, also composition of oil with regards to the various glycerides may be influenced, such as reduction of monoacyl-glycerides and/or diacyl-glycerides, and/or reduction in low molecular weight triglycerides (e.g. trilaurine), thus having a molecular weight in the range below 730.

DETAILED DESCRIPTION

The current invention relates to the use of short-path evaporation for reducing from deodorized triglyceride oils the content of propanol components selected from chloropropanol fatty acid esters, epoxypropanol fatty acid esters, and combinations of two or more thereof, wherein the short path evaporation is performed at a pressure below 1 mbar, preferably below 0.05 mbar, most preferably below 0.01 mbar, most preferably below 0.001 mbar.

The current invention relates to the use wherein the content of propanol components selected from epoxypropanol fatty acid esters is reduced to a content below 500 ppb, preferably below 300 ppb, even more preferably below 150 ppb.

Furthermore, the current invention relates to the use, wherein the content of chloropropanol fatty acid esters is reduced to a content below 500 ppb, preferably below 300 ppb, even more preferably below 150 ppb.

In a preferred embodiment, these propanol components are completely removed (i.e. below limit of quantification).

Short Path Evaporation

Short path evaporation is a distillation technique that involves the distillate travelling a short distance, often only a few centimeters, and is normally done at reduced pressure. This technique is often used for compounds which are unstable at high temperatures or to purify small amounts of compound. The advantage is that the heating temperature can be considerably lower (at reduced pressure) than the boiling point of the liquid at standard pressure, and the distillate only has to travel a short distance before condensing. A short path ensures that almost no compound is lost on the sides of the apparatus.

The short-path evaporation as described in this invention is performed at a temperature of from 90 to 270° C., preferably from 140° C. to 240° C.

The current invention relates to the use wherein the short path evaporation is performed at a temperature of from 150 to 210° C. to reduce the content of propanol components selected from epoxypropanol fatty acid esters in refined, bleached, deodorized palm oil, or at a temperature of from 180 to 270° C. to reduce the content of propanol components selected from chloropropanol fatty acid esters in refined, bleached, deodorized palm oil.

The current invention relates to the use wherein the short path evaporation is performed at a temperature of from 150 to 200° C. to reduce the content of propanol components selected from epoxypropanol fatty acid esters in refined, bleached, deodorized coconut oil or at a temperature of from 150 to 240° C. to reduce the content of propanol components selected from chloropropanol fatty acid esters in refined, bleached, deodorized coconut oil.

Furthermore, the short path evaporation is performed at a pressure below 1 mbar, preferably below 0.05 mbar, more preferably below 0.01 mbar, most preferably below 0.001 mbar.

The use of the short path evaporation allows on the one hand reducing the content and/or complete removal of 3-MCPD esters and/or Glycidyl esters components and combinations of two or more thereof, and on the other hand further reducing the content of acyl glycerol components selected from mono-acyl glycerides and diacyl-glycerides, and low molecular weight triglycerides thus glycerides having a molecular weight in the range below 730, like for instance trilaurine.

The current invention relates to the use wherein further the content of acyl glycerol components selected from mono-acyl glycerides, diacyl-glycerides, and/or triglycerides with molecular weight in the range below 730, and mixtures of two or more thereof, is reduced for at least 60%, more preferably for more than 80%.

Unless specified otherwise, the content of 3-MCPD esters and glycidyl esters either alone or in combination will be determined using Method DGF Standard Methods Section C (Fats) C-VI 18(10) or C-VI 17(10).

The triglyceride oil that is entering the short path evaporator may be derived from deodorized oils of any type, source or origin. They may be derived, for example, from one or more vegetable and/or animal sources and may include oils and/or fats from a single origin or blends of two or more oils and/or fats from different sources or with different characteristics. They may be derived from standard oils or from specialty oils such as low 3-MCPD oils, from modified or unmodified oils and/or fats (i.e. from oils in their natural state or oils that have been subjected to a chemical or enzymatic modification or to fractionation) and so on. Preferably, they will be derived from vegetable oils or vegetable oil blends. Examples of suitable vegetable oils include: soybean oil, corn oil, cottonseed oil, palm oil, palm kernel oil, peanut oil, rapeseed oil, safflower oil, sunflower oil, sesame seed oil, rice bran oil, coconut, oil, canola oil and any fractions or derivatives thereof. According to a particularly preferred embodiment, the refined oils of the present invention will be derived from coconut oil, more preferably from palm oil.

Refining of oils involves degumming and/or neutralization. Degumming is the first stage in the refining process. It is used to separate the gums, phospholipids, proteins etc, that are insoluble in oil when hydrated.

Bleaching

Bleaching is a process whereby impurities are removed to improve the color of the oil. It is typically performed prior to deodorization. The nature of the bleaching step will depend, at least in part, on the nature and quality of the oil being bleached. Generally, a crude or partially refined oil will be mixed with a bleaching agent which combines with oxidation products (e.g. peroxides), trace phosphatides, trace soaps, pigments and other compounds to enable their removal. The nature of the bleaching agent can be selected to match the nature of the crude or partially refined oil to yield a desirable bleached oil. Bleaching agents generally include natural or "activated" bleaching clays, also referred to as "bleaching earths", activated carbon and various silicates. A skilled person will be able to select a suitable bleaching agent from those that are commercially available based on the oil being refined and the desired end use of that oil.

Deodorization

Deodorization is a process whereby free fatty acids (FFAs) and other volatile impurities are removed by treating (or "stripping") a crude or partially refined oil with steam, nitrogen or other inert gasses. The deodorization process and its many variations and manipulations are well known in the art and the deodorization step(s) of the present invention may be based on a single variation or on multiple variations thereof.

Deodorization is typically carried out at elevated temperatures and reduced pressure to better volatilize the FFAs and other impurities. The precise temperature and pressure may vary depending on the nature and quality of the oil being processed. The pressure, for instance, will preferably be no greater than 10 mm Hg but certain aspects of the current invention may benefit from a pressure below or equal to 5 mm Hg, e.g. 1-4 mm Hg. The temperature in the deodorizer may be varied as desired to optimize the yield and quality of the deodorized oil. At higher temperatures, reactions which may degrade the quality of the oil will proceed more quickly. For example, at higher temperatures, cis-fatty acids may be converted into their less desirable trans form. Operating the deodorizer at lower temperatures may minimize the cis-to-trans conversion, but will generally take longer or require more stripping medium or lower pressure to remove the requisite percentage of volatile impurities. As such, deodorization is typically performed at a temperature in a range of 180 to 280° C., with temperatures of about 220-270° C. being useful for many oils (note: the temperatures reflect the temperatures reached by the oils in the deodorizer rather than, for example, that of the steam used during the process). While deodorization is used to remove free fatty acids (FFA) and other volatile impurities, it is also known that during the deodorization step, more in particular at high temperature, propanol components such as chloropropanol fatty acid esters, and epoxy propanol fatty acid esters may be formed.

Furthermore the current invention relates to a process for removing propanol components selected from epoxypropanol fatty acid esters, chloropropanol fatty acid esters, and mixtures of two or more thereof wherein the process is comprising the following steps:
  a. Refining of triglyceride oil,
  b. Bleaching of refined triglyceride oil
  c. Deodorization of refined bleached oil,
  d. Short path evaporation of refined, bleached and deodorized oil at a pressure below 1 mbar, preferably below 0.05 mbar, more preferably below 0.01 mbar, most preferably below 0.001 mbar, and at a temperature of from 120 to 270° C., preferably from 150° C. to 200° C.

In one aspect of the invention it relates to the process wherein the propanol components are selected from epoxypropanol fatty acid esters and the short path evaporation of refined, bleached and deodorized oil is performed at a temperature of from 120 to 210° C., preferably from 150° C. to 200° C.

Further the current invention relates to the process wherein the propanol components are selected from chloropropanol fatty acid esters and the short path evaporation of refined, bleached and deodorized oil is performed at a temperature of from 150 to 270° C., preferably from 180° C. to 240° C.

The invention will hereunder be illustrated in following examples.

EXAMPLES

Analytical Methods

3-MCPD Determination

Analysis of 3-MCPDE and GE either alone or in combination was performed according to DGF-C-VI 17(10) or DGF-C-VI 18(10.

Oil Composition

GPC was used to analyze free fatty acids (=FFA), mono-acyl glycerides (=MAG), di-acyl-glycerides (=DAG), and triglycerides (=TAG).

Example 1

Starting material Refined, bleached and deodorized palm oil (=RBD palm oil) from Cargill. Short Path Evaporation Unit KDL-5 from UIC was used for the short path evaporation. The following conditions were applied:

Feed-temperature: 70° C.
Condenser Temp.: 90° C.
Distillate Temp.: 70° C.
Wiper speed: 366 rpm
Pressure below 10−3 mbar (is within detection limit).
Stabilization time per individual setting: 10 min for Temp. change, 5 min for flow change Feed rate and evaporator temperature were adjusted as given in below table. The results are shown in Table 1.

TABLE 1

Residue composition of samples from SPE of RBD Palm Oil

| Evaporator Temp ° C. | Flow setting | TAG | DAG | MAG | FFA | 3-MCPD (ppm) | GE (ppm) |
|---|---|---|---|---|---|---|---|
| RBD | Start | 89.93 | 8.91 | 0.17 | 0.60 | 3.5 | 6.28 |
| 120 | 800 | 90.10 | 8.84 | 0.57 | 0.33 | 3.12 | 6.73 |
| 120 | 200 | 90.06 | 8.82 | 0.68 | 0.31 | 3.23 | 5.35 |
| 150 | 800 | 90.14 | 8.86 | 0.52 | 0.35 | 3.46 | 5.8 |
| 150 | 200 | 90.06 | 8.84 | 0.62 | 0.48 | 3.2 | 2.64 |
| 180 | 800 | 87.89 | 8.97 | 0.11 | 0.41 | 3.38 | 1.03 |
| 180 | 800 | 90.26 | 8.81 | 0.51 | 0.42 | 2.96 | 1.65 |
| 180 | 200 | 88.09 | 9.02 | 0.00 | 0.31 | 3.45 | 0.48 |
| 180 | 200 | 90.36 | 8.77 | 0.41 | 0.45 | 2.59 | 1.65 |
| 210 | 800 | 88.10 | 8.98 | 0.00 | 0.31 | 3.1 | 0.00 |
| 210 | 800 | 90.59 | 8.63 | 0.38 | 0.40 | 2.82 | 0.36 |
| 210 | 200 | 89.20 | 8.06 | 0.00 | 0.18 | 2.5 | 0.23 |
| 210 | 200 | 91.78 | 7.51 | 0.30 | 0.41 | 2.15 | 0.68 |
| 240 | 800 | 88.16 | 8.93 | 0.00 | 0.30 | 3.2 | 0.85 |
| 240 | 800 | 91.49 | 7.80 | 0.30 | 0.41 | 2.19 | 1.13 |
| 240 | 200 | 96.54 | 2.88 | 0.21 | 0.37 | 0.55 | 0.23 |
| 240 | 100 | 95.27 | 2.01 | 0.00 | 0.23 | 0.47 | 0.16 |
| 240 | 40 | 97.14 | 0.00 | 0.00 | 0.26 | 0.31 | 0.09 |

Example 2

Starting Material is refined, bleached and deodorized coconut oil (=RBD CNO) from Cargill. The following conditions were applied:

Feed-temperature: 70° C.
Condenser Temp.: 90° C.
Distillate Temp.: 70° C.
Wiper speed: 366 rpm
Pressure below 10−3 mbar
Stabilization time per individual setting: 10 min for Temp. change, 5 mm for flow change. Feed rate and evaporator temperature were adjusted as given in below table. The results are shown in Table 2.

TABLE 2

Residue composition of samples from SPE of RBD CNO

| Temp | Flow | 3-MCPD (ppm) | GE (ppm) |
|---|---|---|---|
| CNO | start | 0.85 | 0.35 |
| 120 | 200 | 0.87 | 1.70 |
| 150 | 200 | 0.67 | 0.37 |
| 180 | 200 | 0.39 | 0.01 |
| 190 | 200 | 0.14 | 0.09 |
| 200 | 200 | 0.19 | −0.02 |
| 210 | 200 | 0.12 | −0.04 |
| 240 | 200 | 0.02 | 0.05 |

The invention claimed is:

1. A method for reducing the content of propanol components in a deodorized triglyceride oil comprising
performing short-path evaporation on a deodorized oil at a pressure below 1 mbar,
wherein the content of propanol components in the deodorized triglyceride oil is reduced and the propanol components are selected from the group consisting of chloropropanol fatty acid esters, epoxypropanol fatty acid esters, and combinations thereof,
wherein the short path evaporation is performed at a temperature of from 90° C. to 190° C.

2. The method according to claim 1, wherein the content of epoxypropanol fatty acid esters is reduced to a content below 500 ppb.

3. The method according to claim 1, wherein the content of chloropropanol fatty acid esters is reduced to a content below 500 ppb.

4. The method according to claim 1, wherein the content of acyl glycerol components in the deodorized triglyceride oil is reduced and these acyl glycerol components are selected from the group consisting of mono-acyl glycerides, diacyl-glycerides, and/or triglycerides with molecular weight in the range below 730, and mixtures of two or more thereof.

5. The method according to claim 4, wherein the content of the acyl glycerol components selected from mono-acyl glycerides, diacyl-glycerides, and/or triglycerides with molecular weight in the range below 730, and mixtures of two or more thereof, is reduced by at least 60%.

6. The method according to claim 1, wherein the short-path evaporation is performed at a temperature of from 150 to 190° C. to reduce the content of epoxypropanol fatty acid esters in a refined, bleached, deodorized palm oil.

7. The method according to claim 1, wherein the short-path evaporation is performed at a temperature of from 180 to 190° C. to reduce the content of chloropropanol fatty acid esters in a in refined, bleached, deodorized palm oil.

8. The method according to claim 1, wherein the short-path evaporation is performed at a temperature of from 150 to 190° C. to reduce the content of epoxypropanol fatty acid esters in a in refined, bleached, deodorized coconut oil.

9. The method according to claim 1, wherein the short-path evaporation is performed at a temperature of from 150 to 190° C. to reduce the content of chloropropanol fatty acid esters in a in refined, bleached, deodorized coconut oil.

10. The method according to claim 1, wherein the method comprises the following steps:
   a. refining of triglyceride oil,
   b. bleaching of refined triglyceride oil
   c. deodorization of refined bleached oil, and
   d. short path evaporation of refined, bleached and deodorized oil at a pressure below 1 mbar and at a temperature of from 90-190° C.

* * * * *